United States Patent
Valeze et al.

(10) Patent No.: US 11,090,828 B2
(45) Date of Patent: Aug. 17, 2021

(54) METHOD FOR PARTITIONING A PREDETERMINED PLACEMENT OF PARTS INTENDED TO BE CUT IN A FLEXIBLE SHEET MATERIAL

(71) Applicant: LECTRA, Paris (FR)

(72) Inventors: Bruno Valeze, Martillac (FR); Yohan Michael Christophe Bourget, Pessac (FR)

(73) Assignee: LECTRA, Paris (FR)

( * ) Notice: Subject to any disclaimer, the term of this patent is extended or adjusted under 35 U.S.C. 154(b) by 0 days.

(21) Appl. No.: 16/470,430

(22) PCT Filed: Nov. 29, 2017

(86) PCT No.: PCT/FR2017/053282
§ 371 (c)(1),
(2) Date: Jun. 17, 2019

(87) PCT Pub. No.: WO2018/109301
PCT Pub. Date: Jun. 21, 2018

(65) Prior Publication Data
US 2020/0078973 A1    Mar. 12, 2020

(30) Foreign Application Priority Data
Dec. 16, 2016    (FR) ...................... 1662692

(51) Int. Cl.
*B26D 5/00*    (2006.01)
*G06Q 10/04*   (2012.01)
(Continued)

(52) U.S. Cl.
CPC ............. *B26D 5/005* (2013.01); *B26D 7/018* (2013.01); *B26D 7/18* (2013.01); *B26F 1/3806* (2013.01); *G06Q 10/043* (2013.01)

(58) Field of Classification Search
CPC ........ A41H 3/007; B26D 5/005; B26D 7/018; B26F 1/3806; G06Q 10/043
See application file for complete search history.

(56) References Cited

U.S. PATENT DOCUMENTS 2,170,826 A * 8/1939 McMaster ................. C14B 5/00
                                                     33/6
3,596,068 A * 7/1971 Doyle ..................... A41H 3/007
                                                   700/135
(Continued)

FOREIGN PATENT DOCUMENTS

| EP | 0239665 A2 | 10/1987 |
| FR | 2783191 A1 | 3/2000 |
| WO | 2007085584 A1 | 8/2007 |

OTHER PUBLICATIONS

International Search Report for PCT Application No. PCT/FR2017/053282, dated Jan. 10, 2018.
(Continued)

*Primary Examiner* — Stephen Choi
(74) *Attorney, Agent, or Firm* — Workman Nydegger

(57) ABSTRACT

A method of partitioning involves a predetermined layout of parts that are to be cut out from a sheet of flexible material by moving at least one cutter tool along two directions in at least two distinct and determined cutting windows along which the material is advanced in succession. Starting from a predetermined layout of the parts in the material, the method comprises: automatically creating mutually distinct groups of parts by allocating each part to a single group of parts as a function of its geometrical position, each group of parts being associated, for cutting out, with a single cutter tool and with a single cutting window; and applying spacings between the various groups of parts.

10 Claims, 6 Drawing Sheets

(51) Int. Cl.
    *B26F 1/38*         (2006.01)
    *B26D 7/01*         (2006.01)
    *B26D 7/18*         (2006.01)

(56) References Cited

U.S. PATENT DOCUMENTS

| | | |
|---|---|---|
| 3,761,675 A | 9/1973 | Mason et al. |
| 3,895,358 A * | 7/1975 | Pearl .................... G06Q 10/043 |
| | | 700/1 |
| 5,027,416 A * | 6/1991 | Loriot .................... B26D 5/007 |
| | | 382/111 |
| 5,663,885 A * | 9/1997 | Stahl ......................... B26F 1/38 |
| | | 700/134 |
| 5,748,762 A | 5/1998 | Guez |
| 6,521,074 B1 | 2/2003 | Chabirand Garconnet et al. |
| 6,810,779 B2 * | 11/2004 | Feldman .................. B26D 5/00 |
| | | 700/134 |
| 7,024,976 B2 | 4/2006 | Chabirand Garconnet et al. |
| 8,428,767 B2 | 4/2013 | Tremoureux et al. |
| 9,283,687 B2 * | 3/2016 | Yamanashi .......... G05B 19/409 |
| 2003/0121610 A1 | 7/2003 | Chabirand Garconnet et al. |
| 2010/0268373 A1 | 10/2010 | Tremoureux et al. |

OTHER PUBLICATIONS

French Search Report for FR Application No. 1662692, dated Aug. 29, 2017.

* cited by examiner

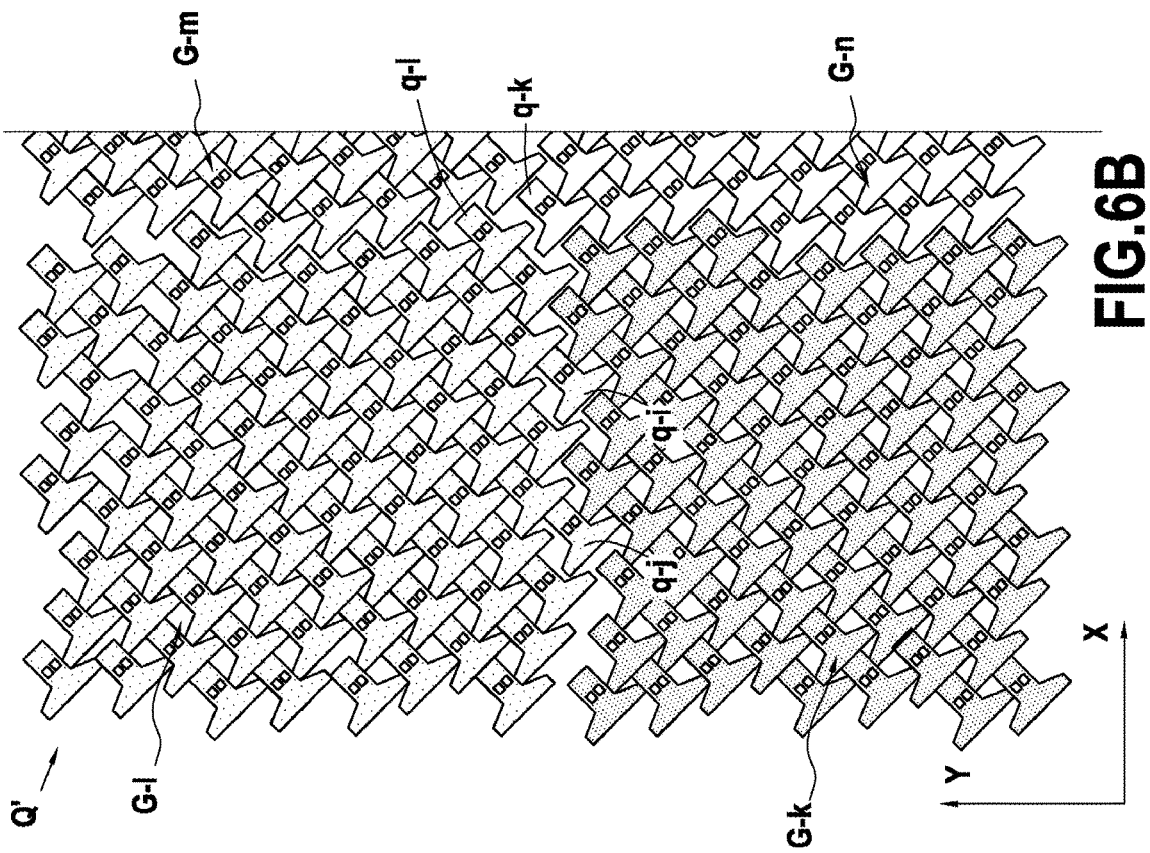
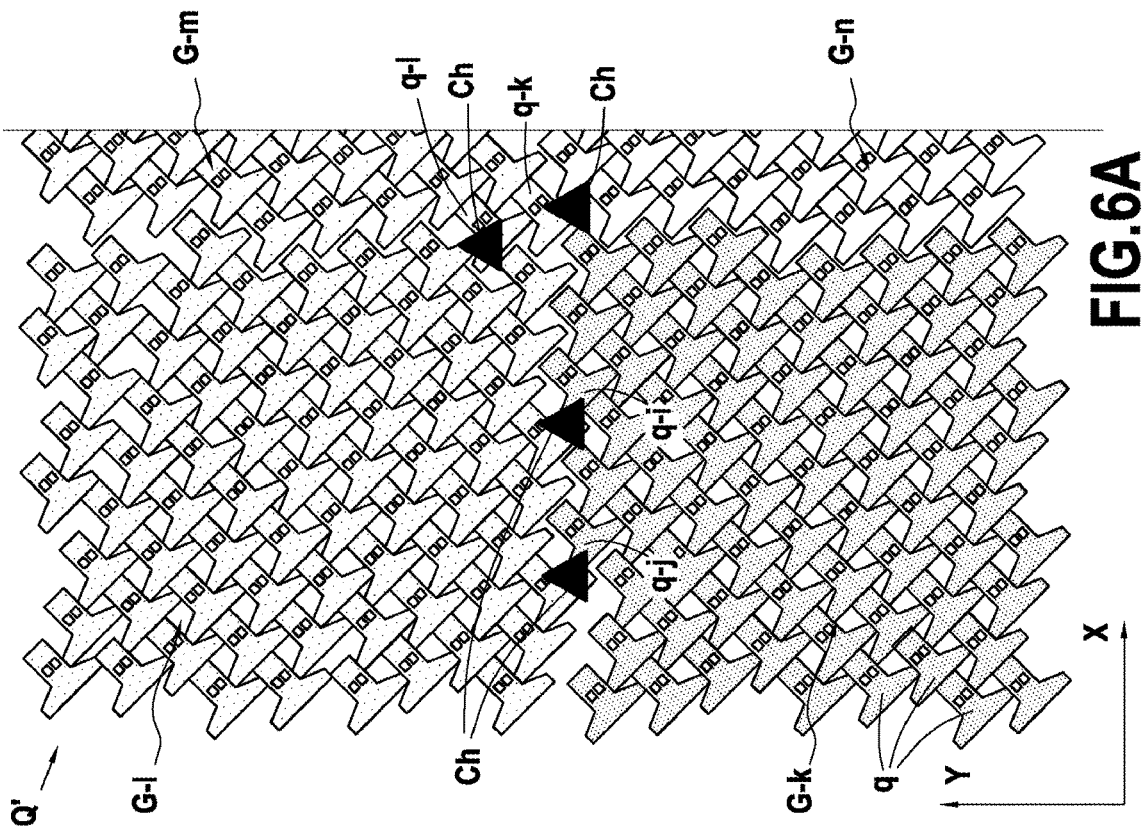

METHOD FOR PARTITIONING A PREDETERMINED PLACEMENT OF PARTS INTENDED TO BE CUT IN A FLEXIBLE SHEET MATERIAL

BACKGROUND OF THE INVENTION

The present invention relates to a method of partitioning a predetermined layout of parts that are to be cut out from a flexible sheet material.

The field of application of the invention is in particular the field of cutter machines that comprise a work table on which parts are cut out by moving one or more cutter tools relative to the material in two directions, successive portions of the material being brought into the working zone of the cutter tools.

This applies in particular to digitally-controlled cutter machines that are used for cutting out fabrics, felts, leathers, or other flexible sheet materials in the clothing, furnishing, automobile, etc. industries.

With such cutter machines, the parts are cut out using a predetermined layout that is defined in such a manner as to minimize losses of material. In order to limit the overall size of such cutter machines, the cutting window (or work zone) in which each cutter tool operates is generally of dimensions that are smaller than in the dimensions of a complete layout. In order to cut out all of the parts in a layout, it is therefore necessary to cause the material to advance intermittently in order to bring new portions of the material into the cutting window, with the advance of the material being controlled separately from moving the cutter tools.

In the field of producing inflatable safety cushions (or "airbags"), manufacturers frequently need to cut up layouts that are made up solely of small parts, with those layouts being optimized for minimizing losses while obtaining a cutting speed that is as fast as possible. Specifically, those layouts are cut up in highly irregular manner and any variation in the optimization of the layout implies non-negligible effects on the consumption of material, and thus on the overall cost of producing such parts.

For this purpose, layouts of this type are generally cut by cutter machines having at least two cutter tools. Those cutter tools work in parallel in cutting windows occupying the entire width of the layout but only a fraction of its length, which means that the material needs to be caused to advance progressively as parts are cut out.

In practice, recurrent problems appear while cutting up layouts, in particular in boundary zones between two sets of parts of the layout that are cut in succession by the same cutter tool. Specifically, it can happen that when the cutter tool begins to cut out a part, parts in neighboring sets of parts have already been cut out. Unfortunately, in this situation, the effect of suction applied to the material, which normally serves to hold the material against the working table during cutting, is greatly reduced around the part for cutting out because of the close proximity of the part for cutting out with parts that have already been cut out. Consequently, the part for cutting out is no longer held so effectively against the working table, such that the cutter tool tends to take material with it as it moves. Usually, this gives rise to cutting defects on those parts.

In order to remedy that problem, the solution consisting in adding spacings between each of the parts in the optimized layout (i.e. providing a margin around each part) is not entirely satisfactory. When such a function is used, successively cutting out parts gives rise to a skeleton that is made up of much more material than it would have in the absence of spacings, thereby increasing the effect of suction on the material, even in zones where most of the parts have already been cut out. That serves to avoid cutting defects. In contrast, adding such spacings leads to a loss of material that can be significant in that type of layout where the number of parts is high (the greater the number of parts, the amount of space that is lost by adding margins is proportionally greater). However, as mentioned above, optimizing losses while conserving a high speed of cutting is a critical issue for manufacturers who make use of layouts of this type.

OBJECT AND SUMMARY OF THE INVENTION

A main object of the present invention is thus to mitigate such drawbacks by proposing to partition a predetermined layout of parts so as to avoid cutting defects in sensitive zones, but without that reducing the efficiency of the layout.

In accordance with the invention, this object is achieved by a method of partitioning a predetermined layout of parts that are to be cut out from a sheet of flexible material by moving at least one cutter tool along two directions in at least two distinct and determined cutting windows along which the material is advanced in succession, wherein, starting from a predetermined layout of the parts in the material, the method comprises: automatically creating mutually distinct groups of parts by allocating each part to a single group of parts as a function of its geometrical position, each group of parts being associated, for cutting out, with a single cutter tool and with a single cutting window; and applying spacings between the various groups of parts.

The method of the invention is remarkable in that starting from an optimized layout of parts, it makes provision for allocating each part of the layout to a group of parts that is associated, for cutting out the part, with a single cutter tool and with a single cutting window. On the basis of these groups of parts, the method of the invention makes provision for adding spacings between the various groups made up in this way. Thus, the method of the invention adds spacings only between groups of parts at locations where the risks of creating cutting defects in the parts have been identified. As a result, the method of the invention serves to avoid cutting defects, while limiting losses of efficiency from the predetermined layout.

The step of automatically creating groups of parts may comprise, for each part of the layout, allocating the part to one of the cutter tools as a function of the transverse position of said part measured along a transverse direction of the material relative to its direction of advance; and if the cutter tool to which the part is allocated has previously been associated with a predefined group of parts, measuring, in the direction of advance of the material, the length of a rectangle that surrounds all of the parts of the group to which said part has been added, and comparing that length with the length of a cutting window;

if the length of the rectangle is less than the length of the cutting window, allocating the part to the predefined group of parts; and if the length of the rectangle is greater than or equal to the length of the cutting window, or if the cutter tool to which the part is allocated has not previously been associated with any predefined group of parts, creating a new group of parts associated with the cutter tool and with a new cutting window and allocating the part to the new group of parts.

Under such circumstances, allocating parts to one of the cutter tools may comprise: partitioning the layout of parts in the width direction of the partitioning as a function of the number of distinct cutter tools used for cutting out the parts, the partitioning of the layout resulting in adjacent layout zones having the same width and each associated with a respective one of the cutter tools, and allocating each part of the layout to one of the layout zones as a function of the transverse position of the part.

Furthermore, prior to allocating each part of the layout to one of the layout zones, the parts are preferably sorted in increasing order as a function of the longitudinal positions of said parts measured along the direction of advance of the material.

Likewise, the transverse position of a part may correspond to the position of the geometrical center of a smallest-size rectangle that surrounds the part.

Preferably, the step of applying spacings between the various groups of parts comprises applying to all of the parts of a given group of parts a common longitudinal shift along the direction of advance of the material and a common transverse shift along the direction transverse to the direction of advance of the material.

Under such circumstances, the longitudinal offset applied to each part of a given group of parts may depend on the cutting window and on the cutter tool with which the group of parts is associated.

Also preferably, the method further comprises, after the step of applying spacings between the various groups of parts, automatically identifying any overlap zones between parts of different groups of parts, and correcting those overlap zones.

The predetermined layout of the parts in the material advantageously corresponds to an optimized layout that is calculated automatically in order to minimize losses of material.

The invention also provides the use of the method as defined above for partitioning a predetermined layout of reinforcing parts for airbags, which parts are to be cut out from a material.

The invention also provides a computer program including instructions for executing steps of the above-defined method of partitioning a predetermined layout of parts.

The invention also provides a computer readable data medium including instructions of a computer program as mentioned above. The data medium may be any entity or device capable of storing the program. For example, the medium may comprise storage means, such as a read-only memory (ROM), for example a compact disk (CD) ROM, or a microelectronic circuit ROM, or indeed magnetic recording means, e.g. a floppy disk or a hard disk.

Furthermore, the data medium may be a transmissible medium such as an electrical or optical signal that can be conveyed via an electrical or optical cable, by radio, or by other means. The program of the invention may in particular be downloaded from a network of the Internet type. Alternatively, the data medium may be an integrated circuit in which the program is incorporated, the circuit being adapted to execute or to be used in the execution of the method in question.

BRIEF DESCRIPTION OF THE DRAWINGS

Other characteristics and advantages of the present invention appear from the following description made with reference to the accompanying drawings, which show implementations having no limiting character. In the figures:

FIGS. 6A and 6B show another exemplary application of the partitioning method of the invention before and after intervention by an operator to eliminate any overlap between the parts of the layout.

DETAILED DESCRIPTION OF THE INVENTION

The invention applies to laying out parts that are to be cut out from a flexible sheet material by digitally controlled cutter machines including a working table on which the parts are cut out.

In known manner, the working table of such a cutter machine is constituted by the top surface of an endless conveyor received in a box within which suction can be established using a technique well known to the person skilled in the art. A flexible sheet material is placed on the endless conveyor, which supports and moves the material continuously along the working table. The material is caused to advance on the working table in a longitudinal direction X under the control of the drive motor of the conveyor.

The installation also includes a cutter system made up of one or more cutter tools that can move horizontally along the longitudinal direction X of the conveyor and also along a transverse direction Y perpendicular to the direction X. Each of these cutter tools moves over a working zone, referred to herein as the "cutting window", with successive portions of the material being moved into these cutting windows by driving the conveyor.

The cutter system of such a machine is digitally controlled, i.e. it is controlled from a computer workstation. The movements of the cutter tools for cutting out the parts are controlled on the basis of a predetermined layout of the parts, which layout is stored in a memory of the workstation.

Typically, the predetermined layout of the parts is a digital file containing instructions for controlling the cutter tools. The predetermined layout is prepared by an operator (or automatically by software) on the basis of the geometrical outlines of the parts, in particular in such a manner as to minimize losses of material and to optimize the speed of cutting.

Figure 1:
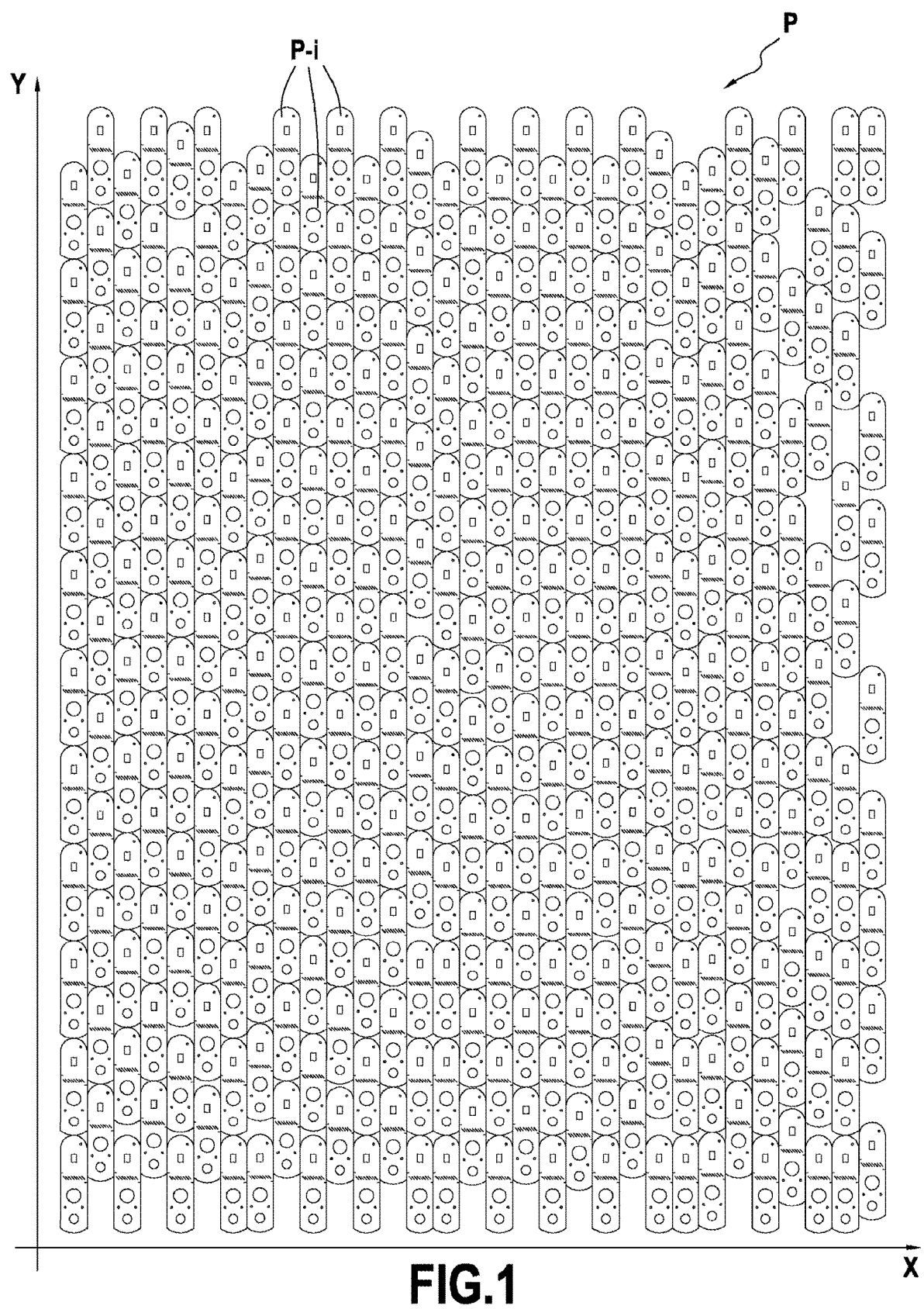
FIG. 1 is a diagrammatic view showing an example of an optimized layout of parts suitable for having the partitioning method of the invention applied thereto.

FIG. 1 thus shows an example of such a layout that is optimized for cutting out a plurality of parts (n parts) that are identical and of small dimensions, in this example, reinforcing parts for airbags.

In this FIG. 1, it can be seen that the layout P of the n parts [p-1, p-2, . . . , p-i, . . . p-n] is compact (the parts are very close to one another) and is organized so as to optimize efficiency (all of the parts are arranged in parallel lines along the axis Y and they are all oriented in the same way).

Starting from such a predetermined layout, P, the invention provides a method of obtaining a partitioned layout P' in which the parts for cutting out are automatically grouped together, as a function of their geometrical locations in the layout, into m groups of different parts [G-1, G-2, . . . , G-h, . . . G-m] each associated with a single cutter tool [O-1, O-2, . . . O-j, . . . O-k] and with a single cutting window [F-1, F-2, . . . F-i, . . . F-l]. The groups of parts as created in this way are then spaced apart from one another.

Figure 2:
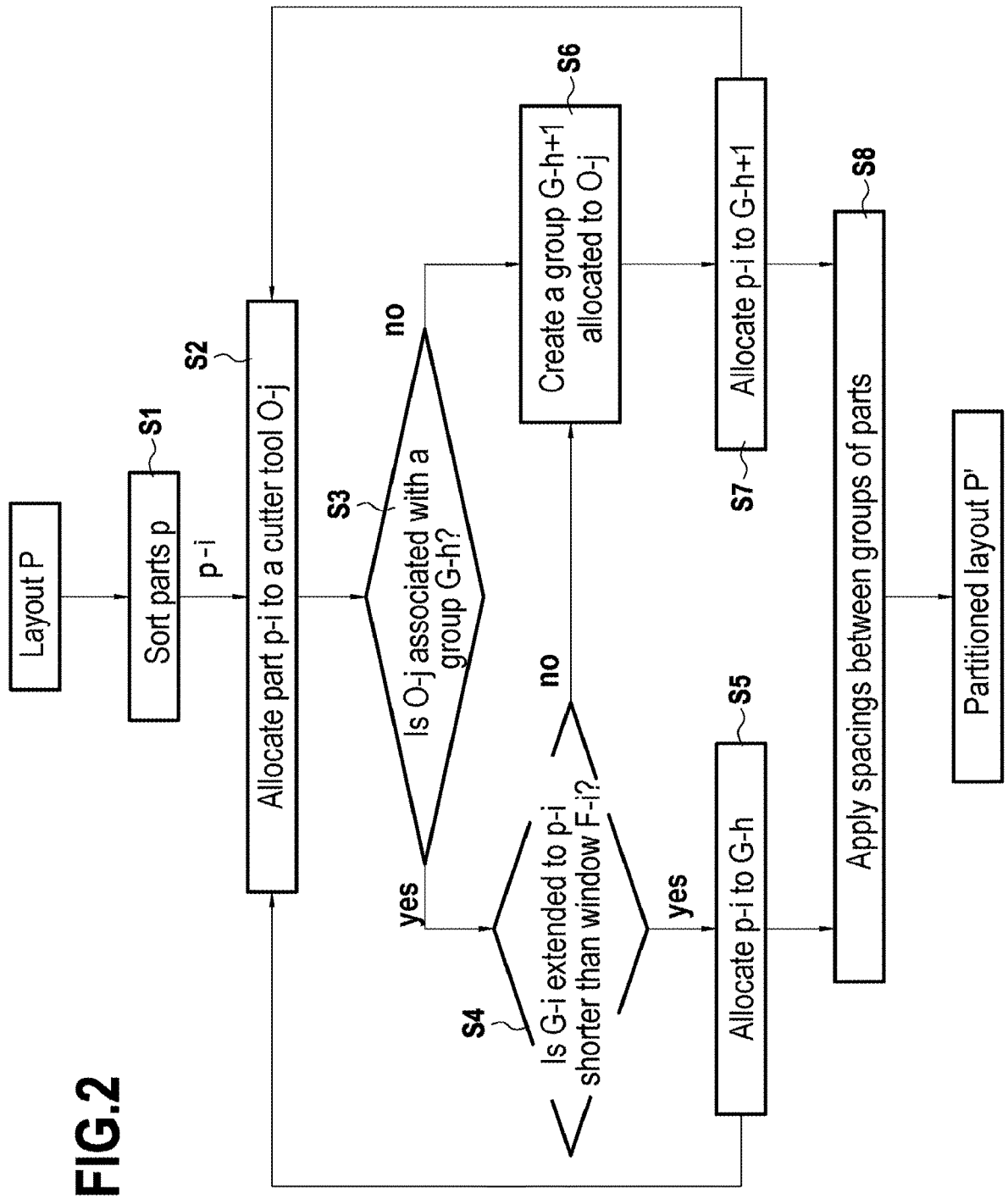
FIG. 2 is a flowchart showing the main steps of the partitioning method of the invention.

FIG. 2 shows the various steps of the partitioning method in an implementation of the invention. In this implementation, the partitioning method is in the form of an algorithm performed within software forming part of the workstation on the basis of the following data input by the operator: digital file containing the layout P, number of cutter tools of the cutter machine with which the layout is to be cut out, and length of a cutting window (all of the cutting windows F-1 to F-l having the same length).

In a first step S1 of the method, all of the parts p-1 to p-n of the predetermined layout P are sorted in increasing order as a function of the longitudinal positions of said parts in the layout measured along the longitudinal direction X of advance of the material on the cutting table.

Figure 3:
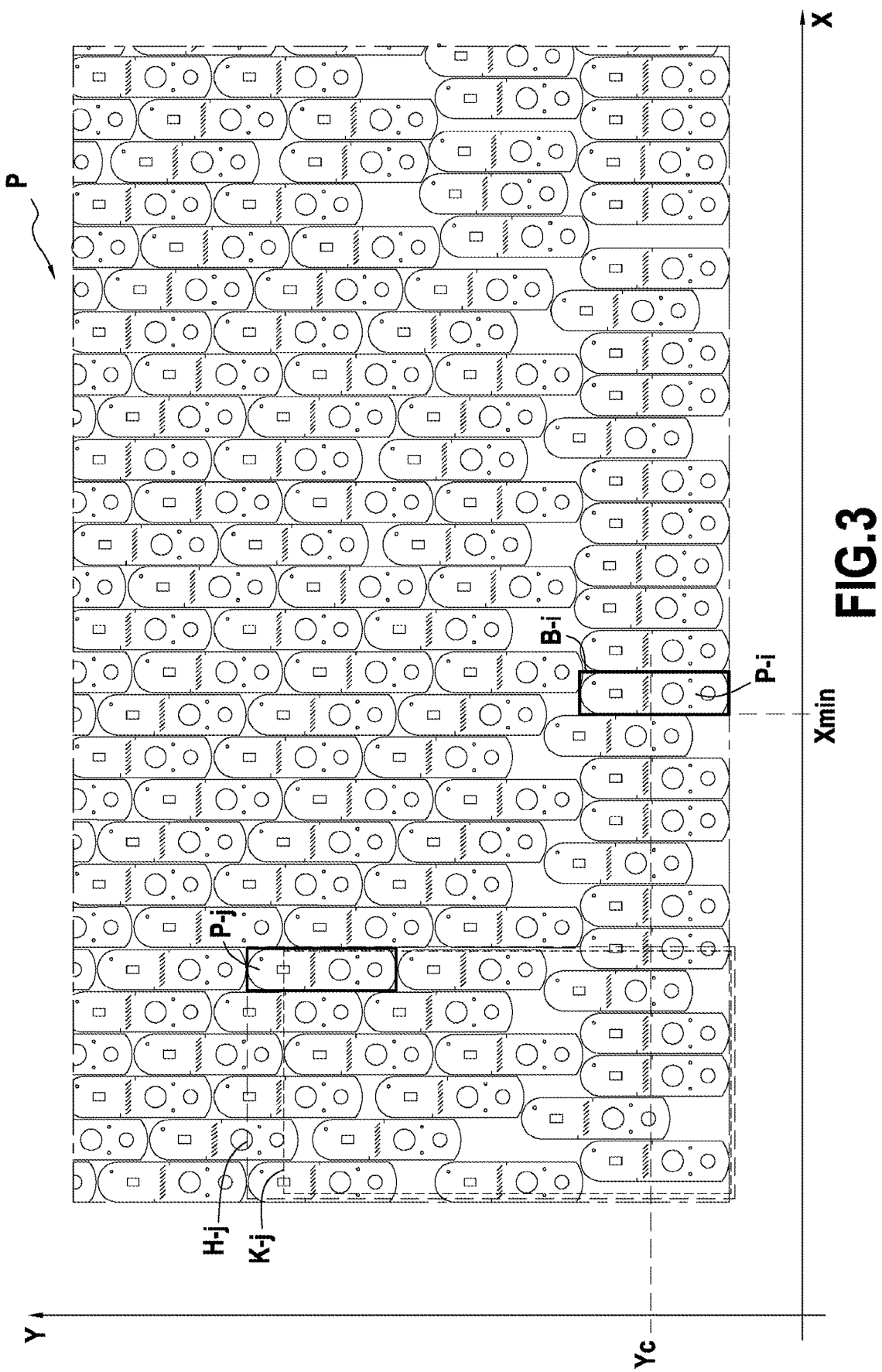
FIG. 3 is a view showing the implementation of one of the steps of the partitioning method of the invention.

More precisely, for each part p-i of the layout, a surrounding box B-i is calculated, which box is constituted by the smallest rectangle that can contain said part (see FIG. 3). All of the parts of the layout are then classified in increasing order from the minimum abscissa coordinate Xmin of the surrounding box B-i associated therewith.

The parts of the layout are then taken one after another as a function of that sorting so as to allocate them to a group of parts in application of steps S2 to S7, which steps are repeated for all of the parts.

In a step S2, each part p-i is allocated to a cutter tool O-i as a function of its transverse position, i.e. of its position taken along the transverse direction Y.

More precisely, in order to determine the transverse position of the part p-i, use is made of the ordinate coordinate Yc of the geometrical center of the surrounding box B-i associated with the part.

In practice, if the cutter machine has only one cutter tool, then all of the parts of the layout are naturally allocated to that single cutter tool.

If the cutter machine has more than one cutter tool O-j, the width of the cutting table is subdivided into as many layout zones as there are cutter tools, the layout zones all being of the same width and each of them being associated with a respective one of the cutter tools. Thus, as a function of the ordinate coordinate Yc of the geometrical center of the surrounding box B-i associated with each part, it is possible to deduce which cutter tool O-j is allocated to the part.

The following step S3 consists in determining whether the cutter tool O-j allocated to the part p-i has previously already been associated with a group of parts G-h.

If so, during a step S4, the method makes provision for calculating the length L measured in the direction of advance X of the material of a rectangle H surrounding all of the parts of the group in question and to which said part is added.

FIG. 3 shows an example of calculating such a length L for the part p-j. In this figure, there can be seen in particular the rectangle K-j surrounding all of the parts of the group of parts G-j associated with the cutter tool. The rectangle identified by the reference H-j corresponds to the rectangle K-j extended to the part p-j. In this example, the length L of the rectangle K-j is identical to the length of the rectangle H-j surrounding only the parts of the group of parts G-j.

The length L as calculated in this way is compared with the length L' of a cutting window F-i previously associated with the group of parts G-h, this length L' being data that is input by the operator.

If the length L of the rectangle surrounding all of the parts of the group in question and to which the part has been added is less than the length L' of the cutting window F-i, then the part in question is allocated to the group of parts G-h associated with the cutter tool O-j (step S5).

Conversely, if the length L of the rectangle surrounding all of the parts of the group in question and to which the part has been added is greater than or equal to the length L' of the cutting window F-i, then the part in question is not allocated to the group of parts G-h associated with the cutter tool O-j.

Under such circumstances, a new group of parts G-h+1, distinct from the group G-h, is created, with this new group of parts being associated with the cutter tool O-j and with a new cutting window F-i+1 (step S6). In practice, the new cutting window F-i+1 is a cutting window that is longitudinally offset towards increasing abscissa coordinates relative to the previously identified cutting window F-i.

The part p-i for which the length L is greater than or equal to the length L' is then allocated to this new group of parts G-h+1 (step S7).

The steps S2 to S7 are reiterated for all of the n parts p-1 to p-n of the layout P.

Once all the parts have been allocated to one of the m groups of parts G-1 to G-m, the method of the invention provides for applying spaces between the various groups of parts G-1 to G-m (step S8).

More precisely, this step of applying spacings between the various groups of parts comprises applying to all of the parts p-i of a given group of parts G-h a common longitudinal shift DX (i.e. along the direction of advance X of the material) and a common transverse shift DY (i.e. along the transverse direction Y).

Figure 4:
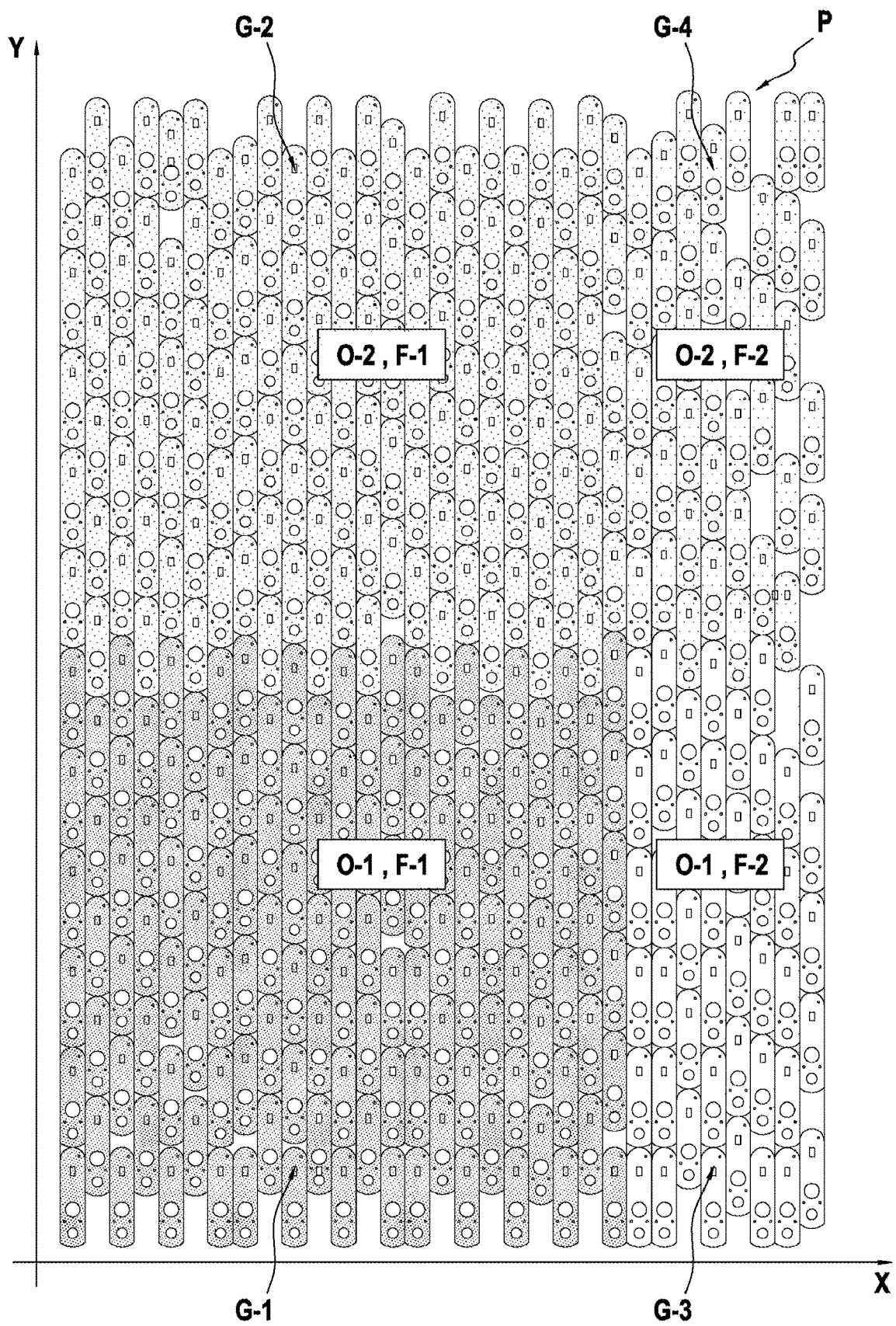
FIG. 4 is a diagrammatic view showing the application of the partitioning method of the invention to the optimized layout of FIG. 1.

FIG. 4 shows an example of applying such spacings. This figure shows four groups of parts G-1, G-2, G-3, and G-4, the groups of parts G-1 and G-3 being associated with the same cutter tool O-1 and with two different cutting windows F-1 and F-2, while the groups of parts G-2 and G-4 are associated with another cutter tool O-2 and with the same two cutting windows F-1 and F-2. These groups of parts G-1 to G-4 are constituted at the end of performing above-described steps S2 to S7.

Figure 5:
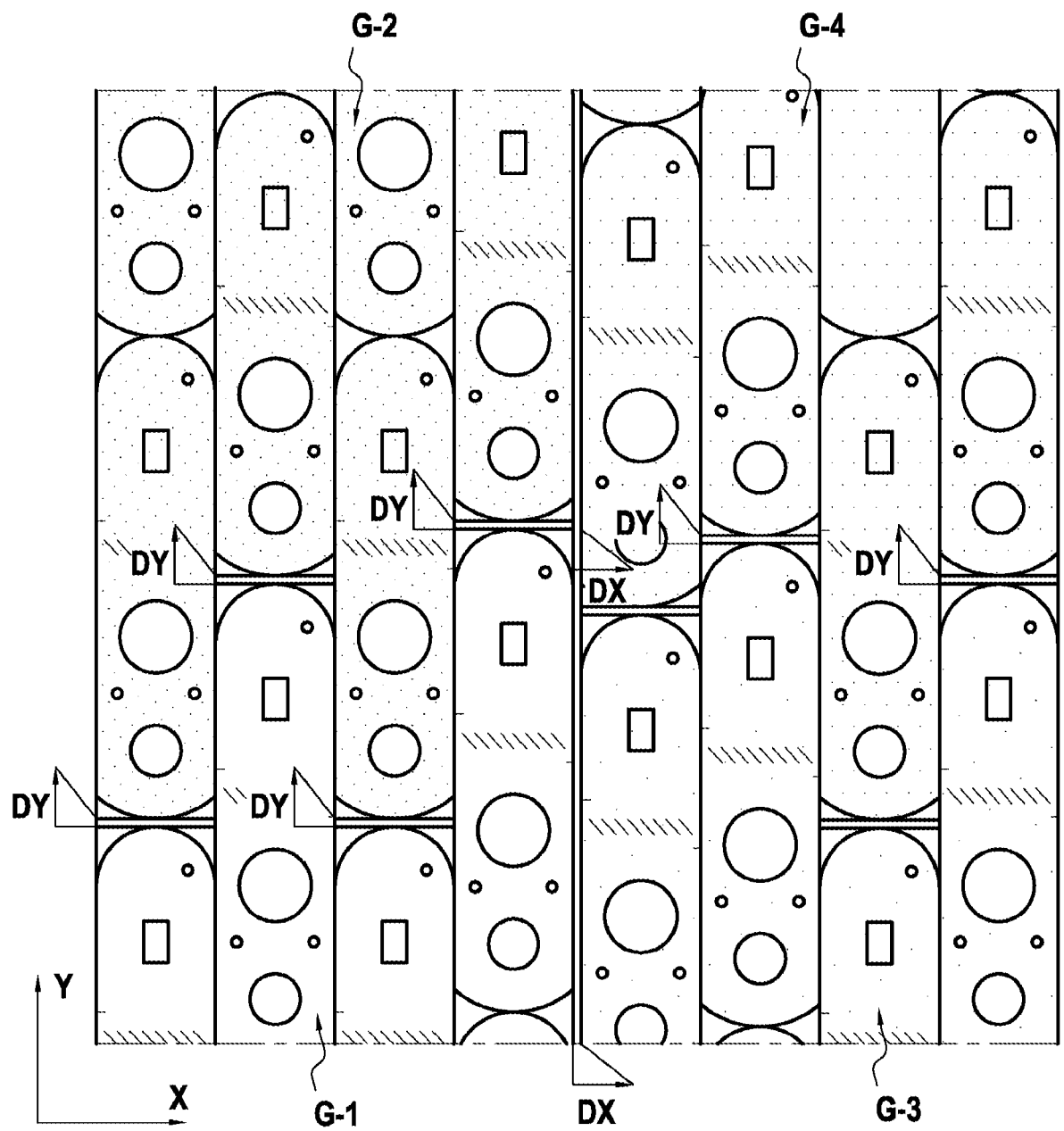
FIG. 5 shows a detail of FIG. 4 on a larger scale.

As shown more precisely in FIG. 5, the spacings DX and DY are then applied between the four groups of parts G-1 to G-4.

In practice, the longitudinal and transverse offsets DX and DY that are applied to each part of a given group of parts depend on the cutting window and on the cutter tool with which the group of parts is associated: the parts of the group of parts G-1 are subjected to no longitudinal offset and no transverse offset; the parts of the group of parts G-2 are subjected solely to the same transverse offset DY; the parts of the group of parts G-3 are subjected solely to the same longitudinal offset DX; and the parts of the group of parts G-4 are subjected both to the same longitudinal offset DX and to the same transverse offset DY.

Once the movements have been applied among the various groups of parts G-1 to G-m, the digital file containing in particular the new geometrical coordinates of the parts is stored so that it can be used by the cutter machine.

FIGS. 6A to 6B show another implementation of the partitioning method of the invention.

In this example, the parts q of the partitioned layout Q' are of a geometrical shape that is different from the shape of the parts of the above-described layout P. As a result of this particular geometrical shape, partitioning as performed by the method of the invention can result in overlaps between parts situated at the boundary between two neighboring groups of parts. These overlaps are identified in FIG. 6A by references Ch.

In this situation, the software of the computer station serves to identify automatically these zones of overlap between the parts and to signal them visually to the operator.

The operator can then intervene manually in order to allocate the parts in question to a group of parts other than the group allocated by the algorithm so as to apply movements to these parts that serve to avoid any overlap with neighboring parts.

Thus, as shown in FIG. 6B, the operator allocates the parts q-i and q-j (previously allocated to the group of parts G-k) to the neighboring group of parts G-l. Likewise, the part q-k previously allocated to the group of parts G-m is allocated to the group of parts G-n, and the part q-l previously allocated to the group of parts G-m is allocated to the group of parts G-l.

Reallocating these parts q-i to q-l to other groups of parts leads to them being shifted automatically, thereby making it possible to avoid any overlap with neighboring parts.

The invention claimed is:

1. A computer-implemented method of partitioning a predetermined layout of parts that are to be cut out from a sheet of flexible material by a cutter machine that drives at least one cutter tool along two directions and over a working zone, successive portions of the flexible material being moved into said working zone by driving a conveyor, a computer being configured to prepare the cut on the basis of the predetermined layout of parts, wherein, starting from the predetermined layout of the parts in the material, the method comprises:

the computer creating two or more mutually distinct groups of parts by allocating each of the parts to a respective one of the groups of parts based on a geometrical position of each of the parts, each of the groups of parts being associated, for cutting out, with a single one of said at least one cutter tool and with a single cutting window; and the computer determining and applying spacings between the groups of parts, including determining and applying to each of the parts of each of the respective groups of parts a respective common longitudinal shift along the direction of advance of the material and a common transverse shift along a direction transverse to the direction of advance of the material.

2. The method according to claim 1, wherein the step of creating the groups of parts comprises, for each of the parts of the predetermined layout of parts, allocating the part to one of the at least one cutter tool based on the transverse position of said part measured along the direction transverse to the direction of advance of the material; and if the cutter tool to which the part is allocated has previously been associated with a predefined group of parts, measuring, in the direction of advance of the material, a length of a rectangle that surrounds all of the parts of the group to which said part has been added, and comparing the length of the rectangle with a length of the cutting window;

if the length of the rectangle is less than a length of the cutting window, allocating the part to the predefined group of parts; and if the length of the rectangle is greater than or equal to the length of the cutting window, or if the cutter tool to which the part is allocated has not previously been associated with any predefined group of parts, creating a new group of parts associated with the cutter tool and with another cutting window and allocating the part to the new group of parts.

3. The method according to claim 2, wherein allocating parts to one of the cutter tools comprises:

partitioning the predetermined layout of parts in a width direction of the partitioning based on a number of distinct cutter tools of the cutter system used for cutting out the parts, the partitioning of the layout resulting in adjacent zones having a same width and each associated with a respective one of the cutter tools; and allocating each part of the predetermined layout of parts to one of a plurality of zones of the predetermined layout of parts based on of the transverse position of the part.

4. The method according to claim 3, wherein prior to allocating each part of the predetermined layout of parts to one of the zones, the parts are sorted in increasing order as a function of longitudinal positions of said parts measured along the direction of advance of the material.

5. The method according to claim 2, wherein the transverse position of a part corresponds to the position of the geometrical center of a smallest-size rectangle that surrounds the part.

6. The method according to claim 1, wherein the longitudinal shift applied to each part of a given group of parts is based on the cutting window and on the cutter tool with which the group of parts is associated.

7. The method according to claim 1, further comprising, after the step of determining and applying spacings between the various groups of parts, the computer identifying any overlap of zones between parts of different groups of parts, and correcting the overlap of the zones.

8. The method according to claim 1, wherein the predetermined layout of the parts in the material corresponds to an optimized layout that is calculated by the computer such that losses of material are minimized.

9. The use of the method according to claim 1, wherein the predetermined layout of parts includes reinforcing parts for airbags, wherein the reinforceing parts are to be cut out from a material.

10. One or more non-transitory computer-readable media having executable instructions stored thereon that when executed by one or more processors of a computer, configure the computer to perform the steps of the method of partitioning a predetermined layout of parts according to claim 1.

* * * * *